N. EPSTEIN.
IMPACT PRODUCING IMPLEMENT.
APPLICATION FILED SEPT. 28, 1920.
1,403,753.
Patented Jan. 17, 1922.
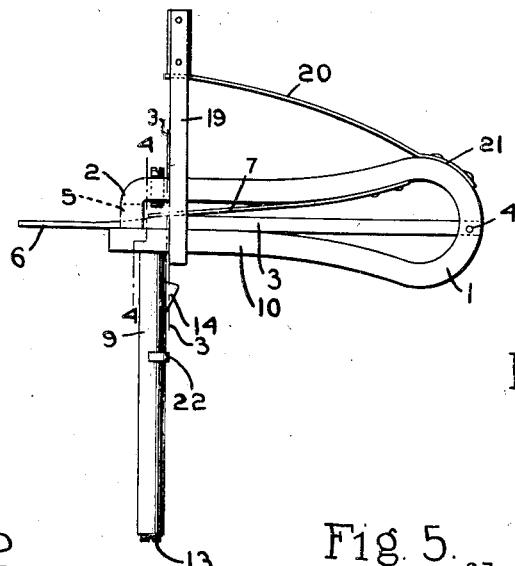
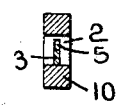
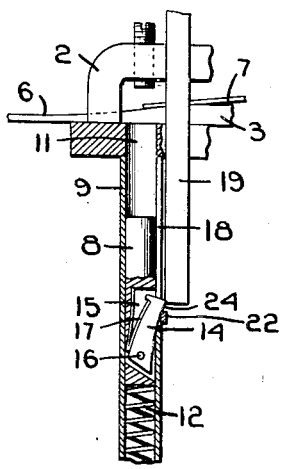
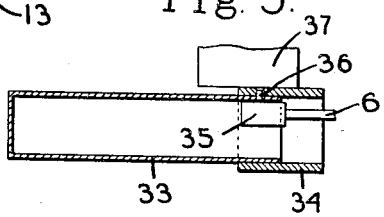
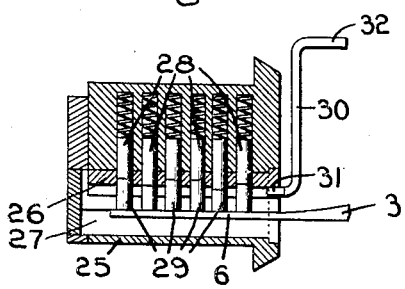
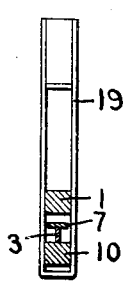
Inventor.
Nathan Epstein
by Heard Smith & Tennant.
Attys.

UNITED STATES PATENT OFFICE.

NATHAN EPSTEIN, OF BOSTON, MASSACHUSETTS.

IMPACT-PRODUCING IMPLEMENT.

1,403,753.   Specification of Letters Patent.   Patented Jan. 17, 1922.

Application filed September 28, 1920. Serial No. 413,430.

*To all whom it may concern:*

Be it known that I, NATHAN EPSTEIN, a citizen of the United States, and a resident of Boston, county of Suffolk, State of Massachusetts, have invented an Improvement in Impact-Producing Implements, of which the following description, in connection with the accompanying drawing, is a specification, like characters on the drawing representing like parts.

This invention has for its object to provide a novel implement designed to produce impacts or hammer-like blows, and which is so constructed that it will deliver said blows within a confined space, as for instance within a small tube or pocket.

A device embodying my invention is capable of a wide range of use, and as illustrating such a wide range, I would state that it is adapted for use as a lock-picking implement, or as an implement for delivering hammer-like blows to a rivet head situated within a tube or other small confined space. Both of these uses are illustrated in the drawings, but they are referred to merely as showing the capacity of the implement for widely different uses, and not for the purpose of in any way limiting the use to which the invention may be put.

My improved implement comprises a frame, which will preferably be constructed so that it can be readily held in the hand, and an impact-delivering member movably connected to the frame and projecting beyond the latter, thereby permitting it to be inserted into the confined space, a spring-impelled or impact-producing member constructed to deliver the hammer-like blows to the impact-delivering element, and means, which is preferably operable by the movement of the thumb or finger of the hand in which the implement is held, for placing the spring of the impact-producing member under tension and then releasing the spring, thereby to deliver the blow.

In order to give an understanding of my invention, I have illustrated in the accompanying drawings some selected embodiments thereof, which will now be described, after which the novel features will be pointed out in the appended claims.

Fig. 1 of the drawings is a side view of the implement embodying my invention.

Fig. 2 is a fragmentary, sectional view on a larger scale, showing the manner in which the spring of the impact-producing element is compressed and then released;

Fig. 3 is a section on the line 3—3, Fig. 1;

Fig. 4 is a section on the line 4—4, Fig. 1;

Fig. 5 is a view showing one way in which the device may be used;

Fig. 6 shows how the device is used as a lock-picking implement.

The implement herein shown comprises a frame 1 which has a general U-shape, the end of one of the arms of the U being bent inwardly toward the other arm, as shown at 2, and constituting a guiding member for the impact-delivering element. This impact-delivering element is herein shown as an arm or lever 3 pivoted to the frame at 4, and extending through a guiding slot 5 formed in the portion 2, said member 3 projecting beyond the frame a considerable distance as shown at 6. The projecting portion 6 of the member 3 constitutes the portion of the device which delivers the impact. The impact-delivering member 3 is acted on by a spring 7 which normally holds it in retracted position.

The end 6 of the member 3 is given its movement to deliver the impact by the operation of a spring-actuated impact-producing element. This impact-producing element is herein shown as a plunger or hammer member 8, which is slidably mounted in the tube 9 secured to and depending from the arm 10 of the frame, said arm having an opening 11 therethrough in alignment with the tube and forming a continuation of the bore of the tube. Situated within the tube 9 is a spring 12 which acts on the member 8 and tends to urge it upwardly or towards the impact-delivering member. The lower end of the spring is shown as being situated against a plug 13 which is screwed into the lower end of the tube 9 and is removable therefrom. By removing the plug 13, the spring 12 and plunger 8 can be removed if such action is necessary.

Means are provided for retracting the plunger 8 and compressing the spring 12 and then releasing said spring, so that the expansive movement of the spring will drive the plunger 8 upwardly in the tube and against the member 3 with a hammer-like blow. This will give a quick, impact-delivering movement to the portion 6 of the impact-delivering member 3. For this purpose I have provided a dog 14 which is situated within a slot 15 formed in the plunger 8 and is pivotally mounted thereto as shown at 16, said dog being acted upon by a spring 17 which tends to move it outwardly. The tube 9 is provided with a slot 18 through which the dog normally projects, as shown in Fig. 1. I have also provided a member 19 which can be operated by the thumb or finger of the hand, and the function of which is to act on the dog 14 and compress the spring 12. This member 19 is in the form of a yoke which embraces the frame, and which is connected at its upper end to a spring arm 20 that is secured to the frame as shown at 21. The member 19 stands in line with the dog 14, so that when said member 19 is moved downwardly against the action of the spring 20, it will engage the dog and thereby carry the plunger 8 downwardly against the action of the spring 12. When the plunger has been fully retracted, then the dog is automatically released from the member 19, thereby allowing the spring 12 to throw the dog forward with a quick movement. For this purpose, the tube 9 is formed with a dog-releasing member 22 situated at the lower end of the slot 18, and arranged so that when the back side 24 of the dog engages the member 22, as shown in Fig. 2, a further downward movement of the dog will cam said dog inwardly out of the path of movement of the member 19, thus disengaging the dog from the member 19. As soon as this has occurred, the spring 12 will automatically expand, thus throwing the plunger 8 forward with a quick movement, and causing it to strike the member 3 with a hammer-like blow. This blow will produce in the member 3 a quick, hammer-like movement the extent of which is limited by the slot 5, and during such movement the spring 7 will be compressed. The spring 7 is a relatively light spring whose only function is to restore the member 3 to its normal position after the blow has been delivered, and therefore the said spring has no appreciable effect in retarding the hammer-like blow of the impact-delivering member 3.

As soon as the member 19 has been depressed to a point sufficient to release the dog, then said member is released and returned to its normal position by the action of the spring 20.

The frame is of such a shape that it can be conveniently held in the hand, and the member 19 can conveniently be depressed by the action of the thumb or one of the fingers.

One use to which the invention is especially adapted is that of picking so-called cylinder locks, and in Fig. 6, I have illustrated the manner in which the device can be used for this purpose. In said figure, 25 indicates the cylinder of a cylinder-lock, 26 indicates the plug having the key slot 27, 28 indicates the spring-pressed, tumbler pins carried by the cylinder 25, and 29 indicates the drivers which are actuated by the key to line up the tumbler pins when the key is inserted.

One familiar way of picking a lock of this type is to jar the barrel repeatedly, and at the same time apply a slight pressure to the plug, the jarring operation resulting in driving the tumbler pins 28 backwardly against the action of their springs. A continued jarring will eventually line up all of the tumbler pins so that the plug can be turned.

In using my device for picking a lock the projecting portion 6 of the impact-delivering member 3 is inserted in the key slot 27 beneath the drivers 29, and then the device is operated thereby to give impacts to the drivers. This results in driving the tumbler pins backwardly against the action of the spring, and by exerting a slight pressure on the plug during this operation, any tumbler pin which is driven back completely out of the plug 26 will be held in such position so long as the pressure is applied. By delivering the repeated impacts against the drivers, it is possible to line up all of the tumbler pins, thereby unlocking the plug so that it can be turned. The pressure may be applied to the plug in various ways while the impacts are being delivered. One way would be by using an implement 30 in the form of a crank, one end 31 of which is inserted into the upper end of the key slot, and the other end 32 of which constitutes a finger-piece by which turning pressure may be applied to the plug. The shape of the impact-producing implement is such that it can operate on a cylinder lock while the latter is in the door, so that this invention provides a device by which a cylinder lock can be readily picked without removing it from the door.

Another use to which the invention is especially applicable is illustrated in Fig. 5, wherein 33 indicates a tube having one end inserted into a sleeve or tube 34 and which it is desired to rivet to the sleeve 34. When the implement is to be used for this purpose, the projecting end 6 of the impact-delivering member will preferably be formed with a hammer-head 35 of a size that it can be inserted into the tube 33—34. After the rivet 36 is inserted, then the outer end of the rivet may be held against an anvil 37 and the hammer-head 35 introduced within the sleeves. By actuating the implement, the hammer-head will give the inner end of the rivet repeated blows sufficient to upset the end of the rivet, and thus rivet the two tubes together.

The above are only two suggestions as to uses to which the invention may be put, and I wish it understood that the invention is capable of a variety of other uses.

I claim:

1. In an impact-producing implement, the combination with a frame having a guide, of an impact-delivering member movably mounted on said frame, a relatively light spring acting against said member in opposition to its impact-delivering movement, a spring-actuated impact-producing member slidable in said guide and adapted to strike the impact-delivering member a hammer-like blow, and a reciprocating actuator adapted during its movement to engage the impact-producing member thereby to compress its spring and then to release said member to permit the spring to act.

2. In an impact-producing implement, the combination with a frame, of an impact-delivering member pivotally mounted thereon, a relatively light spring acting against said impact-delivering member in opposition to its impact-delivering movement, a spring-actuated impact-producing member adapted to strike the impact-delivering member a hammer-like blow, a dog carried by the impact-producing member, and an actuator arranged to engage the dog and thereby compress the spring of the impact-producing member, and then to release the dog to permit said spring to act.

3. In an impact-producing implement, the combination with a frame constructed to be held in the hand and having a tubular guiding member extending laterally therefrom, of an impact-delivering member pivoted to the frame and extending beyond the latter, a spring-actuated impact-producing member slidably mounted in said tube, the latter being slotted, a dog carried by said impact-producing member and operating in said slot, and an actuator arranged to engage the dog and thereby move the impact-producing member backwardly against the spring, and means for releasing the dog from said actuator.

4. In an impact-producing implement, the combination with a frame constructed to be held in the hand, and having a tubular guiding portion extending laterally therefrom, of an impact-delivering member pivoted to the frame and extending beyond the latter, a relatively light spring acting against said impact-delivering member in opposition to its impact-delivering movement, an impact-producing member slidably mounted in the tube, the latter having a slot, a dog pivoted to the impact-producing member and extending through the slot, a spring acting on said impact-producing member, and an actuating member movably carried by the frame and adapted to engage said dog, thereby to compress said spring, and means for automatically releasing the dog from said actuator when the spring is compressed, so that the latter will cause the impact-producing member to deliver a hammer-like blow against the impact-delivering member.

In testimony whereof I have signed my name to this specification.

NATHAN EPSTEIN.